Oct. 5, 1965   R. E. JACKSON ETAL   3,210,498
MAGNETIC REED ADJUSTABLE SWITCHING MEANS
Filed Dec. 18, 1961   4 Sheets-Sheet 1

INVENTORS
ROBERT E. JACKSON
ALBERT B. MEWHINNEY
BY
*Albert H. Reuther*
THEIR ATTORNEY Oct. 5, 1965 R. E. JACKSON ETAL 3,210,498
MAGNETIC REED ADJUSTABLE SWITCHING MEANS
Filed Dec. 18, 1961 4 Sheets-Sheet 2

| DUTY | SWITCH NO. | NO. OF SEGM'TS | SPAN OF SEGM'TS |
|---|---|---|---|
| RESET START | 1 | 2 | 45° |
| TOP STOP | 6 | 2 | 45° |
| COUNT | 3 | 2 | 180° |
| COUNT | 4 | 2 | 180° |
| FEED ROLLS | 2 | 2 | 120° |
| OPEN | 5 | | |

INVENTORS
ROBERT E. JACKSON
ALBERT B. MEWHINNEY
BY
THEIR ATTORNEY

INVENTORS
ROBERT E. JACKSON
ALBERT B. MEWHINNEY
BY
Albert H. Reuther
THEIR ATTORNEY Oct. 5, 1965   R. E. JACKSON ETAL   3,210,498
MAGNETIC REED ADJUSTABLE SWITCHING MEANS
Filed Dec. 18, 1961   4 Sheets-Sheet 4

INVENTOR.
ROBERT E. JACKSON
ALBERT B. MEWHINNEY
BY
THEIR ATTORNEY

United States Patent Office 3,209,498
Patented Oct. 5, 1965

3,209,498
MACHINE TOOL RIGIDITY CONTROL MECHANISM
Albert H. Dall, Cincinnati, Ohio, assignor to The Cincinnati Milling Machine Co., Cincinnati, Ohio, a corporation of Ohio
Filed July 9, 1963, Ser. No. 293,675
16 Claims. (Cl. 51—165)

The present invention relates to a machine tool and more particularly to an automatic control mechanism included in a centerless grinding machine to compensate for the pinchout of workpieces during through-feed grinding operations.

The lack of infinite rigidty in a machine tool presents problems the solutions to which often are expensive or impractical to apply to the machine. For example, the most obvious solution to a lack of sufficient rigidity is to make the machine more massive and thus stronger. However, the cost of this solution in terms of materials, space and convenience often rules it out as a satisfactory solution. An example of the problem is found in centerless grinding machines adapted to perform a through-feed operation to very close tolerances. Continuous operation, through-feed grinding processes employing wide grinding wheels are commonly performed on large lots of short cylindrical workpieces. By this process, rough workpieces are moved into one end of the grinding throat between previously positioned grinding and regulating wheels. The finished workpieces are discharged from the other end of the grinding throat, having been moved therethrough by an axial thrust force produced during grinding and resulting from the relative orientation of the grinding and regulating wheels. In a continuous operation of this sort, the most efficient use of the grinding machine is achieved by feeding the workpieces to the machine in a continuous and uninterrupted string such that the grinding throat is filled end to end except at the start and finish of the operation. While the grinding throat is filled, the operation produces nearly constant stresses within the machine which result in a slight separation of the grinding and regulating wheels due to flexing of the machine structure. When the throat is not filled, these stresses are reduced and the wheels move back together slightly. This movement of the wheels apart during heavy grinding loads and together during light grinding loads is sometimes referred to as "pinchout" and occurs since the machine structure has less than infinite rigidity. As a result of this slight change in wheel spacing, the size of workpieces operated upon during periods of reduced stress or grinding load is somewhat smaller. Automatic loading mechanisms normally are utilized to insert the workpieces into the grinding machine in a continuous flow. These loaders are subject to intermittent failures and jamming and therefore sometimes allow an interruption of the continuous flow of workpieces in the process. Thus some workpieces are produced that are slightly smaller than the workpieces produced during normal, uninterrupted feed. If the finished workpieces are to conform to very close tolerances such as a range of deviation of only a few ten thousandths of an inch, these smaller workpieces very probably are scrap and must be rejected. In a high volume continuous operation, finding these smaller workpieces may involve the expensive process of accurate measurement of each workpiece. This is undesirable, of course. It also should be pointed out that the continuous feed of workpieces which have a substantially varying unfinished size range will also produce the varying load stresses within the grinding machine with the resulting variation of finished part size the same as in an intermittent feed situation.

It is therefore the object of this invention to provide a centerless grinding machine with an automatic compensation mechanism to reduce the size variation of finished workpieces even though the workpieces are intermittently supplied to the machine or are of substantially varying size before presentation to the machine for grinding.

It is also an object of this invention to provide a mechanism for use in a machine tool by which the machine tool can be provided with the effect of infinite rigidity.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes a fluid actuated piston mechanism variably to apply compensating stresses in a machine tool tending to offset the effect of stresses therein resulting from the reaction forces of a cutting operation. The compensating stresses are produced in response to an electrical signal indicating the magnitude of reaction forces and stresses in the machine in a manner such that the algebraic sum of stresses, resulting from these reaction forces and compensating stresses in the machine tends to be constant over a predetermined range of operation. A clear understanding of the present invention can be obtained from the following detailed description in which reference is made to the attached drawings wherein:

Figure 1:
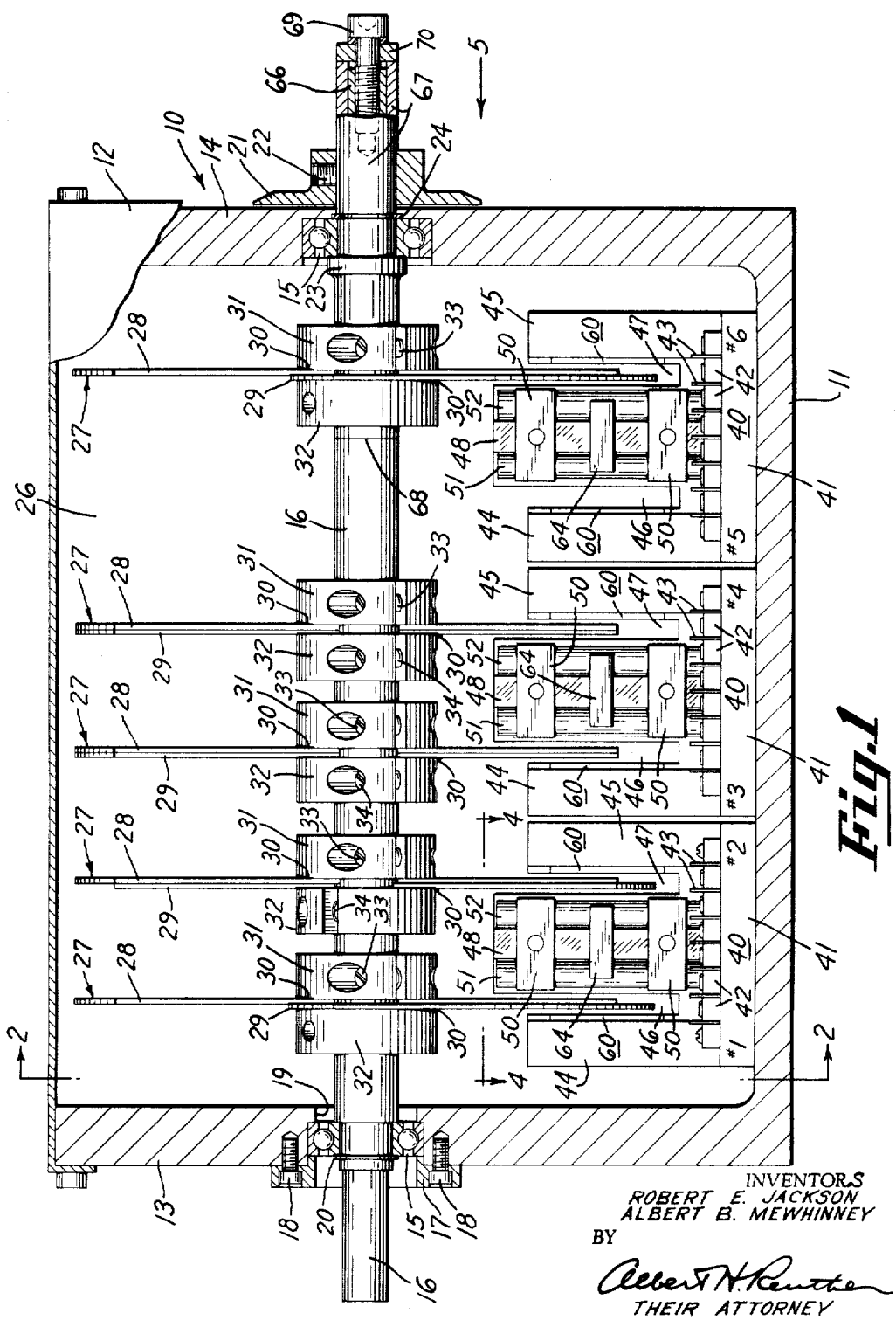
FIG. 1 is a front elevation of a centerless grinding machine with pinchout compensation.

As shown in FIG. 1, a centerless grinding machine is comprised of a base 10 on which a grinding wheel 12 fixed to a rotatable spindle 14 is supported in a spaced relation from a regulating wheel 16. The regulating wheel 16 is also fixed to a rotatable spindle 18 carried by a slide 20 for movement toward and away from the grinding wheel 12. During a grinding operation, a workpiece 22 is supported on the inclined top surface of a blade support 24 that is attached to a sub-slide 26 which in turn is slidable on the base 10 toward and away from the grinding wheel 12 to afford positioning of the blade support 24 close to the grinding wheel 12 after which it is securely clamped to the base 10. The slide 20 on which the regulating wheel 16 is received is slidable on the sub-slide 26 but remains in an adjusted position thereon during a grinding operation. The workpiece 22 is held on the top of the blade support 24 and against the grinding wheel 12 by the regulating wheel 16. The grinding wheel 12 is rotated at a high rate of speed to perform the metal cutting while the regulating wheel 16 is rotated slowly to hold the workpiece 22 against the grinding wheel 12 and to govern the speed of rotation of the workpiece 22 such that it does not pick up the peripheral speed of the grinding wheel 12. The space between the grinding and regulating wheels 12, 16 above the blade support 24 can be termed the throat of the grinding machine in which the grinding operation is performed. The regulating wheel 16 is inclined slightly away from the horizontal direction such that axis of rotation is not parallel to that of the grinding wheel 12 and a through-feed thrust is produced on workpieces received in the throat in a well known manner. Also shown in FIG. 1 is the electrical control cabinet 25 in which the control circuits for the machine's operation are contained.

Figure 4:
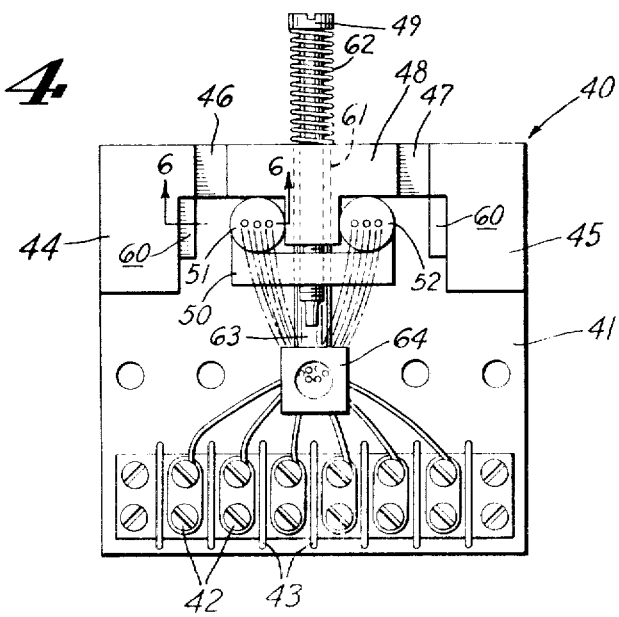
FIGS. 4 and 5 are simplified plan views of the grinding throat of a centerless grinder such as the machines of FIGS. 1 and 2 to illustrate the occurrence of different grinding loads therein.
Figure 5:
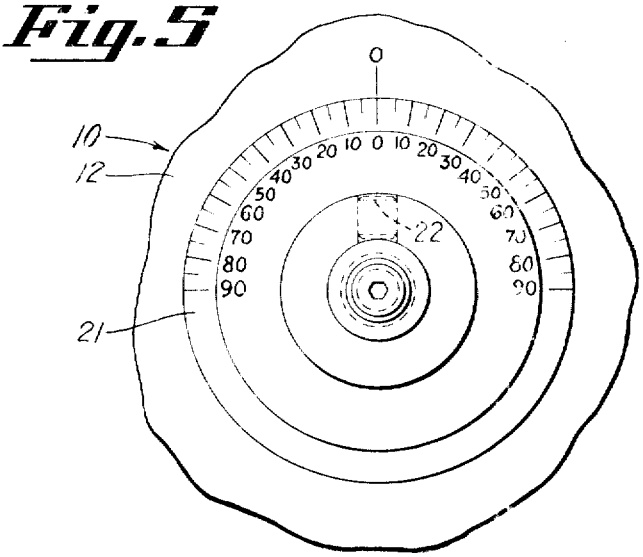
Figure 6:
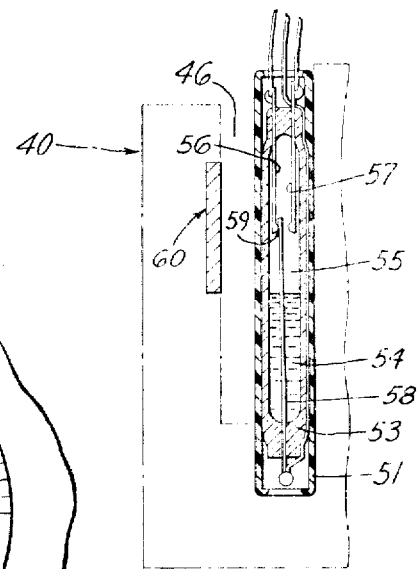
FIG. 6 is a partial view of the right side portion of the machine of FIG. 1.

The throad of a wide wheel application of the centerless grinding machine is shown in FIGS. 4, 5 with the grinding and regulating wheel axis parallel to simplify the illustration. The grinding wheel 12 is oriented along one side and the regulating wheel 16 is along the other side. Both wheels 12, 16 are mounted on and rotated with respective spindles 14, 18. The blade support 24 extends between the wheels 12, 16 and, as shown in FIG. 4, supports an unbroken row of workpieces 22 through the throat during normal operation. In this normal operation, if each of the workpieces 22 has about the same amount of metal to be removed therefrom and if the row of workpieces is not interrupted, it is apparent that nearly constant reaction forces due to the grinding load are produced between the workpieces 22 and the wheels 12, 16 tending to separate the wheels. These forces create stresses in the machine structure supporting the wheels 12, 16, these stresses including a bending moment in the base 10 of the machine. The reactive forces applied to the machine during its operation can be considered as negative in their direction of magnitude and the stresses resulting therefrom can also be termed negative for purposes of this description. If the supply of workpieces 22 is interrupted and the grinding of the remaining workpieces in the throat continues as in FIG. 5, it can be observed that the reaction forces are much reduced in magnitude since the grinding wheel 12 is removing stock from fewer workpieces 22 at one time than in the normal condition represented by FIG. 4. When the feed of workpieces 22 is resumed, the normal conditions will not again occur until the throat is full as in FIG. 4. Thus, the last few workpieces 22 before a work feed interruption and the first few after a work feed resumption are ground when the negative forces between the wheels 12, 16 and the stresses within the machine are lower to allow the wheels 12, 16 to spring back and move slightly together.

The grinding machine in FIG. 1 has a rigid member 28 fixed to and extending from one side of the base 10. The member 28 is engaged by a piston rod 30 extending from a piston 32 slidably received in a cylinder 34 bearing at its lower end directly against the floor 36 on which the machine base 10 is resting. Fluid under pressure supplied below the piston 32 forces the rod 30 upward tending to lift one end of the grinder. This lifting force at the end of the machine tends to bend the base 10 in the opposite direction. That is to say, the lifting force tends to bend the base 10 in a direction such that the grinding wheels 12, 16 tend to be moved together. This stressing of the machine to tend the wheels together, being opposite to the grinding stresses which have been termed negative, are then positive compensation stresses.

Figures 2, 3:
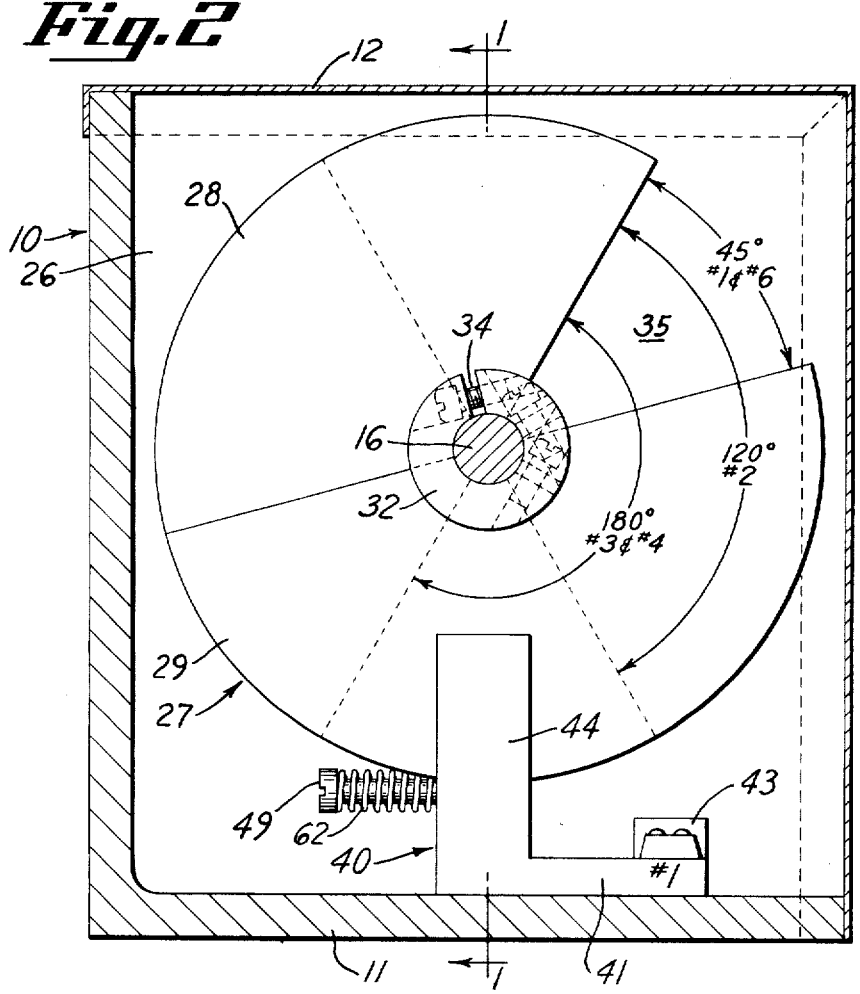
FIG. 2 is a partial front elevation of a centerless grinding machine with an alternate arrangement of the compensation mechanism of this invention.
FIG. 3 is a schematic electrical and hydraulic control circuit for the described machines of FIGS. 1 and 2.

In FIG. 3, an electro-hydraulic circuit is shown by which fluid is supplied to the cylinder 34 below the piston 32 in direct relation to the grinding load of the machine so that as the stresses separating the wheels 12, 16 are increased, the compensating stresses in the base 10 closing the wheels 12, 16 together are increased and the algebraic sum of the stresses tends to remain constant over a preset range and a smaller variation of wheel spacing is achieved between low and full grinding load conditions. It has been found that the reaction forces acting radially on the grinding and regulating wheels bear a nearly constant ratio to the reaction forces thereon acting tangentially. The motor load signal is a direct reflection of the tangential load and therefore can be used to indicate the radial forces which are the forces that tend to separate the wheels. As shown, a hydraulic fluid pressure supply line 38 from a pump 40 supplied fluid under pressure to the cylinder 34. The pressure line 38 is also connected to one end of a fixed fluid resistance 42 the other end of which is connected directly to a low pressure return duct 44. The pressure line 38 also is connected through a pressure reducing valve 46 and fluid line 48 to a servo-type rate valve 50. A plunger 52 in the valve 50, when positioned as shown, is in its fully closed condition and the fluid in the line 48 is isolated from the low pressure duct 44 which also connects with the valve 50. Therefore, in the condition shown, the fluid pressure in the line 38 is dependent solely upon the pump 40 and the discharge flow through the resistance 42 which is the highest pressure condition available and the piston 32 is urged upward with its maximum force. It can be seen that the shifting of the plunger 52 rightward from the position shown to its fully open condition connects the line 48 to the return duct 44 in a nearly unrestricted manner to create a parallel fluid path from the line 38 to the return duct 44 bypassing the resistance 42. Consequently the pressure in the line 38 will drop to its lowest value to produce very little upward force on the piston 32. The plunger 52 is positionable in any condition between fully closed and fully open to produce an infinitely varying restriction in the fluid bypass path with the resulting infinitely variable pressure range between the highest and lowest values corresponding to the fully closed and fully open conditions in the valve 50. The pressure reducing valve 46 is included in the fluid path to the servo-valve 50 to make the fluid pressure change at the line 38 linear over the operating range of the system, that is to make the pressure in the line 38 follow directly the magnitude of the shift of the plunger 52 between its fully open and fully closed positions.

The plunger 52 is positioned in the valve 50 by the operation of a torque motor 54 which includes an energizing coil 56 and an axially movable and resilient shaft 58. The axial position of the shaft 58 is determined by the direction and amount of current flow through the coil 56 in a well known manner and a detailed description of the torque motor 54 is not deemed necessary. The shaft 58 is in threaded engagement at its outer end with the plunger 52 to hold the plunger in a position corresponding to the level of energization of the torque motor coil 56. The level of energization of the coil 56 is dependent upon the potential difference between a pair of output terminals 60, 62 of a pair of independently excited diode bridge rectifiers 64, 66. The terminals 60, 62 are of similar polarity. The other direct current terminals 68, 70 of the rectifiers are connected directly together by a conductor 72. Each of the rectifiers 64, 66 has a load resistance 72, 74, respectively, connected from the common conductor 72 therebetween to the output terminals 60, 62. The potential at the output terminal 60 with respect to the common line 72 is determined by the adjustment of a wiper contact 76 which couples a selected alternating current potential from a resistance element 78 to a transformer primary 80 energizing a secondary 82 connected across the bridge rectifier 64. The potential at the terminal 62 is determined by the current flow through one of the power supply lines 84 by which a constant speed motor 86 driving the grinding wheel spindle 14 is energized. An alternating current signal proportional to this current flow in the line 84 is coupled from a primary inductive winding 88 in that line to a secondary winding 90 that is connected across the rectifier bridge 66. As the load on the motor 86 increases, both the current in the line 84 and the potential across the winding 88 increase proportionally. The load on the motor 86 is an indication of the grinding load and is proportional to the reaction forces tending to separate the wheels, i.e., as greater grinding reaction forces are developed between the wheels 12, 16 and the workpieces 22, more current will be required to operate the motor 86 at a constant speed. As the potential across the winding 88 increases, the potenelectrical energy. Positioning of the segments 28–29 of the plate means or interrupting means 27 determines range of rotary-limit switching in accordance with the arcuate distance of gap or openings 35 for particular settings of the hub portions 31 and 32 on the shaft means 16 which can be turned manually through a crank or gear means or which can be powered by suitable motor driven gearing for use of the switching device or mechanism to control equipment operation requiring considerably less maintenance than on cam-actuated dynamo-electric machine controller apparatus.

It is to be noted that the metal disc-like segments 28 and 29 are also made of magnetic material for interrupting and shunting magnetic flux from the permanent magnet means 60 which require a minimum of servicing and which can be adjusted in positioning thereof on the shaft means so as to provide adjustable switching means in accordance with the present invention. The adjustable switching means having components with features in accordance with the present invention can also be used advantageously in locations where explosive mixtures are present in the air or atmosphere without danger of igniting such fumes or dust-like particles. The cartridge units and the permanent magnet means as well as the plate-like members or interrupting means 27 can operate free of any open arcing or sparking. The cartridge units can be hermetically sealed and the adjustable metal plate means can be shiftable into the recess or gap-like spaces 46–67 silently and effectively to permit contact make and break operation.

With further reference to FIGURE 1 particularly, it is noted that shaft means 16 includes a reduced diameter portion 66 over which a sleeve can be concentrically and telescopically fitted to a juncture 68. This juncture 68 can be located axially along the shaft means 16 between any predetermined group or pair of disc or plate-like means 27. However, for clarity the juncture 68 in FIGURE 1 is shown adjacent to a location where a hub portion and disc or plate-like means can be added later for another function. A free end of the reduced diameter portion 66 of the shaft means 16 is threaded to receive a screw or fastening means 69 having an integral head portion adapted to abut against washer or end cover means 70 such that the sleeve means 67 is held tightly in position with an end thereof forming the juncture 68 forced axially against the shaft means 16 as the fastening means 69 is tightened. A suitable tool such as a wrench or screwdriver can be applied to the fastening or screw means 69 whenever adjustment or positioning of hub portions and disc or plate-like members carried by the sleeve 67 is to be accomplished. By provision of the indicator means 21 also secured to an outer periphery of this sleeve 67 fitted over the reached diameter portion 66 of the shaft means 16, it is possible to determine positioning of at least one disc or plate-like means relative to radially positioned cartridge units or contact reed-like arm means.

It is to be noted that each of the hermetically sealed cartridge units 51–52 is mounted to be positioned substantially radially outwardly from the axis of the shaft means 16 including the reduced diameter portion 66 thereof and sleeve means 67. It has been found that erratic operation of magnetic reed-like contact carrying arms occurs whenever positioning other than substantially radial location thereof is utilized. It is also to be noted that in place of a pair of disc or plate-like members a single disc can be slotted or cut out to provide a predetermined gap to permit passage of magnetic flux from a single electromagnet or permanent magnet means utilized for biasing of the magnetic reed-like contact arm means. By radial location of the reed-like switch contact arm means in replaceable cartridge units, it is possible to have edges of the recesses or cutouts formed by the disc or plate-like means to coincide substantially parallel to the longitudinal axis of the reed-like arms and cartridge units such that improved accuracy in operation is attainable.

An end of the shaft means 16 in a location remote from the indicator means 21 and adjustable shaft end including sleeve portion 67 and fastening means 69 can be connected to fixed gearing particularly where switching operations performed by the disc or plate-like members of the shaft means 16 in locations further away from the indicator means 21 are for functions such as reset-start as well as feed rollers, counting and the like. Adjustable stop operation indicated for switch number 6 in the illustration of FIGURE 1 can occur according to setting of the indicator means 21.

Figure 7:
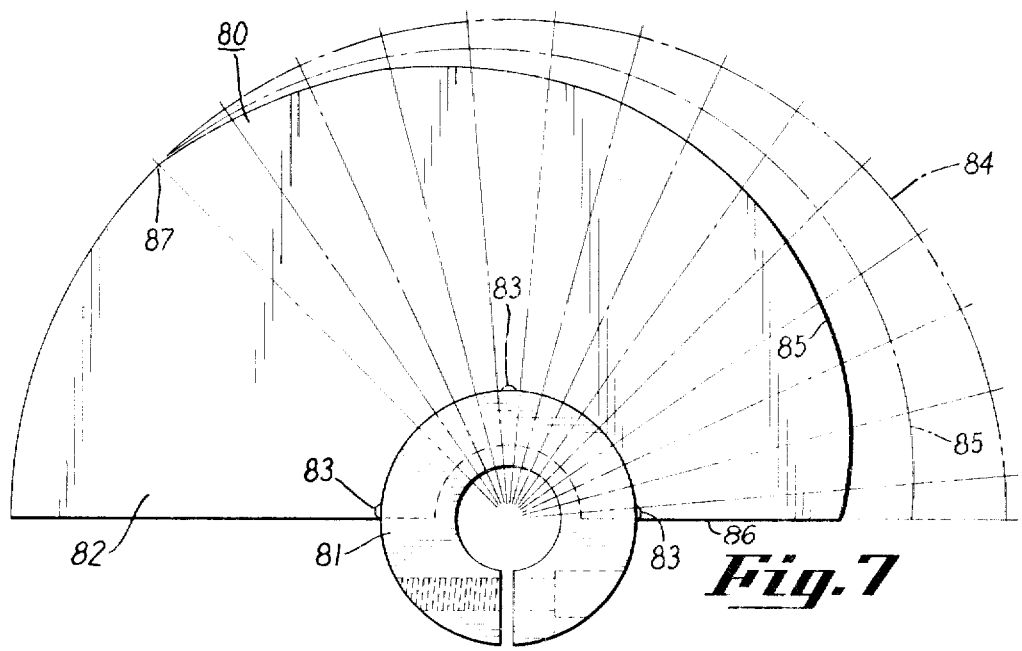

Provision of cartridge units mounted radially for increased accuracy can also avoid contact contamination and the adjustable switching means can also be fitted with a unitary disc or plate means generally indicated by numeral 80 in FIGURE 7 and including a hub portion 81 adapted to fit on the shaft means 16 or sleeve portion 67 similar to positioning of hub portions 31–32. The disc means 80 includes a modification to improve adjustable switching means operation by having an initially semi-circular body portion 82 spot welded at 83 to the hub portion 81 or otherwise fastened thereto. However, to improve range of operation and to avoid hunting as well as erratic on-off switching particularly for counting purposes, it has been found advantageous to remove a portion 84 indicated in an outline to one side of the view of FIGURE 7 so as to provide a substantially cam-like or spiral edge 85 having a predetermined curvature beginning with a shortened radial edge 86 and terminating in a juncture 87 in a quadrant differing from that including the shortened radial edge 86. The unitary disc or plate means 80 can broaden span of effectiveness of a field of flux from a magnet means for operation of radially mounted switching means having reed-like magnetic contact arm means.

Figure 8:
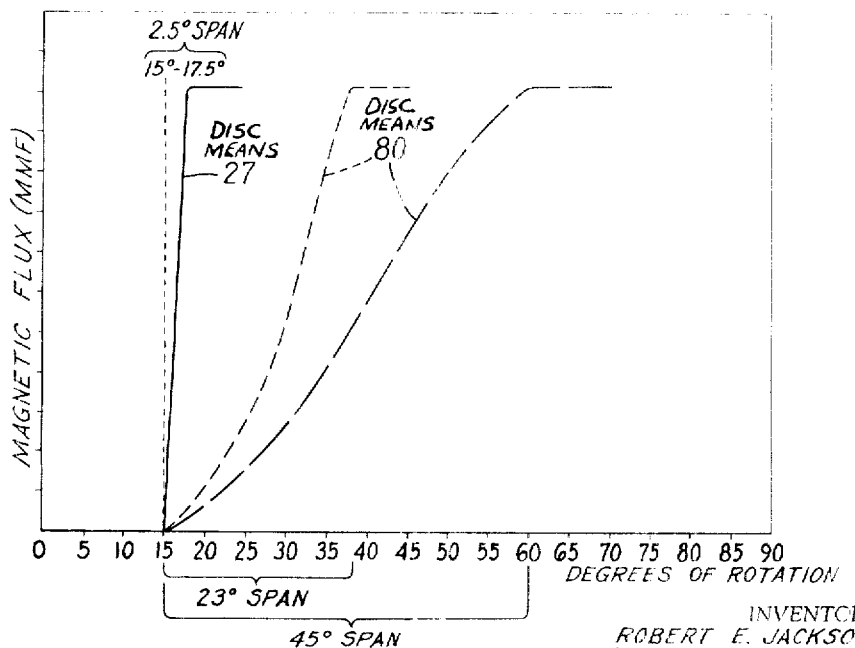

A graph of FIGURE 8 illustrates degree of rotation resulting in switching operation for the differing embodiments. When using discs or plate-like members 27 having cutouts defined by radial edges which when coinciding in location or substantially parallel to magnetic reed-like contact arms result in biasing thereof generally operate over a span of substantially two and one-half degrees of rotation. Sometimes the adjustable switching means can be used on stator winding machine equipment utilizing electronic counters and vibration or hunting of contacts will result in high frequency pulses which can trip such a contact for erratic rotation and operation. Use of the spiral edged disc or plate means 80 can result in a broadened and in a smooth and stable adjustable switching operation. The particular disc or plate means 80 illustrated in FIGURE 7 has a cam-like or spiral edge 85 adapted to result in a switching operation over a rotating range of substantially 23°. Some variation in the configuration of this spiral or cam-like edge 85 can result in a span upwards of 45° of rotation and three curves plotted in the graph of FIGURE 8 are labeled for the span of 2.5° rotation for actuation, 23° span of rotation for actuation as well as 45° span of rotation for actuation. Location of the particular point for beginning the tabulation of degrees of rotation can be varied.

It is apparent from the graphical representation of FIGURE 8 that chances for hunting or jumping back and forth between on-off switching positions as a result of vibration can occur much more readily where the 2.5° span of rotation is obtained. Use of the cam-like or spiral edge such as 85 provides greatly improved results and features in accordance with the present invention can contribute greatly to substantially maintenance-free though serviceable adjustable switching operation.

While the embodiments of the present invention as herein disclosed constitute a preferred form, it is to be understood that other forms might be adopted.

What is claimed is as follows:

In an assembly of readily serviceable though variable interval switching means including a box-like housing having a removable cover thereon for access to space through which a shaft means is journalled adjacent to opposite ends of the housing, elements therewith comprising, in combination, plural L-shaped body portions of non-conducting material each having a base that rests on the housing in the space as well as integral upwardly extending arm-like segments located remote from each other on each side of a central upward segment of T-shaped cross section, said segments having cutouts therebetween in locations adjacent to said T-shaped cross section of said central segment, cartridge means each including a fixed terminal means and complementary movable contact means on a reed-like flexible arm of magnetic material secured to opposite sides of said T-shaped cross section central segment located radially of the shaft means, permanent magnet means secured to each arm-like segment in a location at each cutout which establishes predetermined distance to said cartridge means and also extending radially of the shaft means, a displaceable spring-biased retaining clamp means carried by said central T-shaped segment of each of said L-shaped body portions, said clamp means having a width that holds said cartridge means to said T-shaped segment yet displaceable during cartridge means servicing, plural arcuately segmented plate-like magnetic metal members each having a predetermined curvature spiral edging shortened radially inwardly that covers a span in a range between 2.5° and 45° rotation of said members carried on the shaft means in various radial positions, said members including edging thereof having a path of rotation always directly in the cutouts of said L-shaped body portions and intermittently through accurately in shunt positioning between said permanent magnet means and said cartridge means, said members including edging thereof during shunt positioning having a blockage of magnetic biasing flux from said permanent magnet means to said cartridge means free of arcing, contact bounce and damage because said edging is always spaced from positive engagement with all other elements including said permanent magnet means and said cartridge means, and an external shaft-mounted position indicator dial means removable therefrom per se during shaft disassembly from one end of the housing, said members including edging shortened radially inwardly in spiral path having independently variable arcuate positioning per se that selectively interrupts magnetic biasing of the cartridged contact means as to the fixed terminal means.

References Cited by the Examiner

UNITED STATES PATENTS

| | | | |
|---|---|---|---|
| 2,827,531 | 3/58 | O'Brien | 200—19 |
| 2,945,931 | 7/60 | Reese | 200—87 |
| 2,977,468 | 3/61 | Louret | 200—87 |
| 2,978,553 | 4/61 | Bundy et al. | 200—38 |
| 2,982,826 | 5/61 | Dorothea | 200—38 |
| 2,999,914 | 9/61 | Stanaway | 200—19 |
| 3,013,137 | 12/61 | Vanden Broeck | 200—19 |
| 3,087,030 | 4/63 | Shebanow | 200—19 |
| 3,114,020 | 12/63 | Hall | 200—87 |

FOREIGN PATENTS 538,409   8/41   Great Britain.

BERNARD A. GILHEANY, *Primary Examiner.*

RICHARD M. WOOD, ROBERT K. SCHAEFER,
*Examiners.*